United States Patent
Kerkman et al.

[19]

[11] Patent Number: 5,990,658
[45] Date of Patent: Nov. 23, 1999

[54] APPARATUS FOR CONTROLLING REFLECTED VOLTAGE ON MOTOR SUPPLY LINES

[75] Inventors: Russel J. Kerkman, Milwaukee; David Leggate, New Berlin; Gary L. Skibinski, Milwaukee, all of Wis.

[73] Assignee: Allen-Bradley Company, LLC, Milwaukee, Wis.

[21] Appl. No.: 09/010,796

[22] Filed: Jan. 22, 1998

[51] Int. Cl.[6] .................................................. H02M 1/12
[52] U.S. Cl. .............................. 318/811; 318/434; 363/41
[58] Field of Search .................................. 318/798–815, 318/599, 434; 363/41, 56, 131, 132, 57, 58; 361/23, 30, 33

[56] References Cited

U.S. PATENT DOCUMENTS

| | | | |
|---|---|---|---|
| 4,468,725 | 8/1984 | Venturini | 363/160 |
| 4,488,216 | 12/1984 | Gyugyi et al. | 363/160 |
| 4,578,746 | 3/1986 | Gyugyi et al. | 363/161 |
| 4,739,240 | 4/1988 | MacMinn et al. | 318/696 |
| 4,833,586 | 5/1989 | Inaba et al. | 363/41 |
| 5,610,806 | 3/1997 | Blasko et al. | 363/41 |
| 5,671,130 | 9/1997 | Kerkman et al. | 318/811 |

*Primary Examiner*—Jonathan Salata
*Attorney, Agent, or Firm*—Michael A. Jaskolski; John M. Miller; John J. Horn

[57] ABSTRACT

An apparatus for receiving and modifying a PWM trigger signal such that consecutive ON and OFF periods have durations at least as long as a critical dwell time where the critical dwell time is the minimum time required to avoid greater than twice overvoltage. The trigger signals are modified by, each time a trigger signal changes from low to high, providing a minimum pulse signal which remains high for the greater of a critical dwell time or the time over which the trigger signal remains high, when the minimum pulse signal changes from high to low, providing a maximum pulse signal which remains low for a critical dwell time, adding the maximum and minimum pulse times using a logical AND gate and providing the output of the AND gate as a modified trigger signal.

12 Claims, 8 Drawing Sheets

APPARATUS FOR CONTROLLING REFLECTED VOLTAGE ON MOTOR SUPPLY LINES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to variable frequency AC motors and more particularly to an apparatus for altering stator winding voltages to eliminate greater than twice overvoltage.

One type of commonly designed induction motor is a three phase motor having three Y-connected stator windings. In this type of motor, each stator winding is connected to an AC voltage source by a separate supply line, the source generating currents therein. Often, an adjustable speed drive (ASD) will be positioned between the voltage source and the motor to control motor speed.

Figure 1:
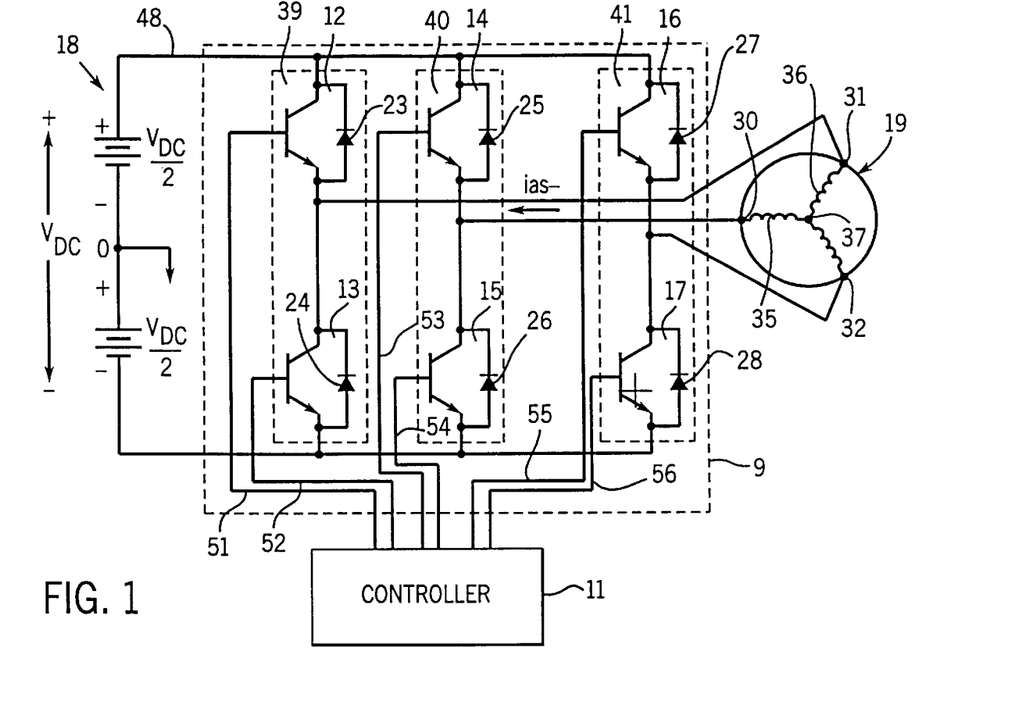
FIG. 1 is a schematic diagram of a controller and a PWM inverter which incorporate the present invention.

Many ASD configurations include a pulse width modulated (PWM) inverter consisting of a plurality of switching devices and a controller for controlling the inverter. Referring to FIG. 1, an exemplary inverter 9 has six switches 12–17. The switches 12–17 are arranged in series pairs, each pair forming one of three inverter legs 39, 40, and 41. Referring to leg 39, by triggering switches 12, 13 ON and OFF in a repetitive sequence, leg 39 receives DC voltage 18 and provides high frequency voltage pulses to a motor terminal 31.

Figure 2:
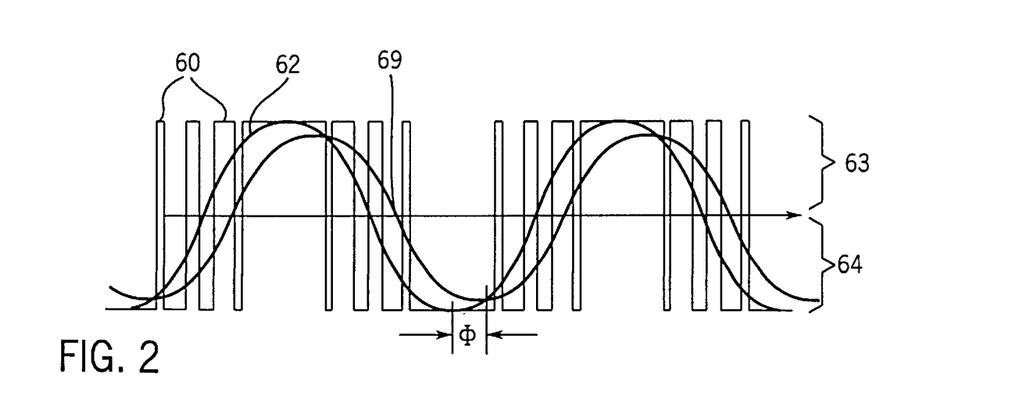
FIG. 2 is a graph illustrating high frequency pulses and a resulting low frequency alternating voltage applied to a stator winding by a PWM inverter.

Referring to FIG. 2, an exemplary sequence of high frequency voltage pulses 60 that inverter 9 might provide to terminal 31 can be observed along with an exemplary low frequency alternating fundamental voltage 62 and related alternating current 69. By varying the widths of positive portions 63 of each high frequency pulse relative to the widths of negative portions 64 over a series of high frequency voltage pulses 60, a changing average voltage which alternates sinusoidally can be generated. The changing average voltage defines the low frequency alternating voltage 62 that drives the motor. The low frequency alternating voltage 62 in turn produces a low frequency alternating current 69 that lags the voltage by a phase angle φ. By triggering switches 12 and 13 in a regulated sequence inverter 9 can be used to control both the amplitude and frequency of voltatage 62 that eventually reach the 10 stator windings.

Figures 3A, 3B:
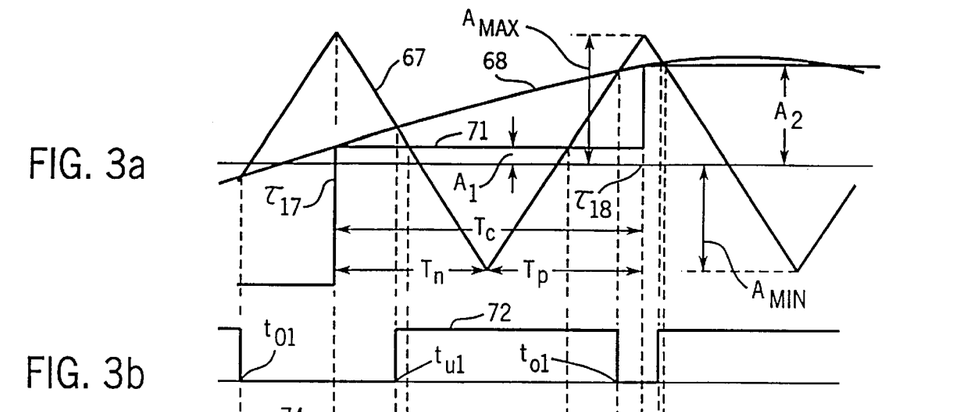

Referring to FIG. 3(a), representative waveforms used to generate triggering signals for leg 39 may be observed. As well known in the art, a carrier waveform 67 is perfectly periodic and operates at what is known as the carrier frequency. A command voltage waveform 68 is sinusoidal, having a much greater period than carrier waveform 67.

Figure 3C:
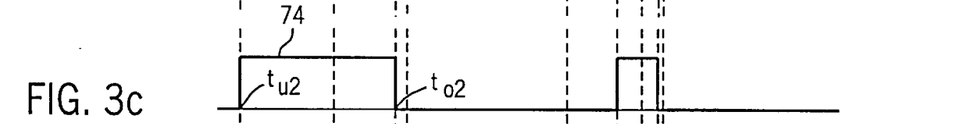

Referring also to FIGS. 3(b) and 3(c), an upper signal 72 and a lower signal 74 that control the upper and lower switches 12, 13 respectively can be observed. The turn-on $t_{u1}$, $t_{u2}$ and turn-off $t_{o1}$, $t_{o2}$ trigger times of the upper and lower signals 72, 74 come from the intersections of the command waveform 68 and the carrier waveform 67.

When waveform 68 intersects carrier waveform 67 while carrier waveform 67 has a positive slope (i.e. during periods $T_p$), upper signal 72 goes OFF and lower signal 74 goes ON.

On the other hand, when waveform 68 intersects carrier waveform 67 while carrier waveform 67 has a negative slope (i.e. during periods $T_n$), upper signal 72 goes ON and lower signal 74 goes OFF. Thus, by comparing carrier waveform 67 to command waveform 68, trigger times can be determined.

Figure 3D:
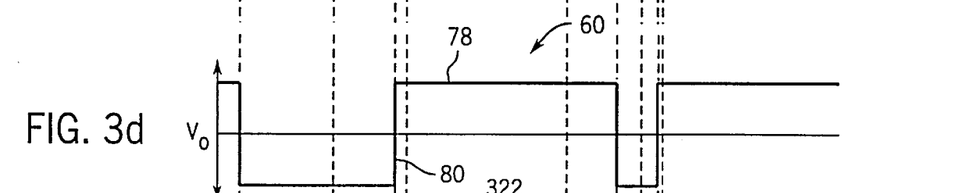
FIGS. 3(d) and 3(e) are graphs illustrating high frequency pulses delivered to a motor terminal.

Referring to FIGS. 1 and 3(d), an ideal high frequency voltage pulse 60 resulting from upper and lower signals 72, 74 in FIGS. 3(b) and 3(c) that might be provided at terminal 31 can be observed. When upper signal 72 is ON and lower signal 74 is OFF, device 12 allows current to flow from high voltage rail 48 to motor terminal 31 thus producing the positive phase 78 of pulse 60 at motor terminal 31. Ideally, when upper signal 72 goes OFF and lower signal 74 goes ON, device 12 immediately turns OFF and device 13 immediately turns ON connecting motor terminal 31 and low voltage rail 49 producing the negative phase 80 of pulse 60 at motor terminal 31. Thus, ideal high frequency voltage pulse 60 is positive when upper signal 72 is ON and negative when lower signal 74 is ON.

The method by which waveform comparison is implemented depends on the type of hardware used to configure a controller. Controller hardware can generally be divided into two different types, analog and digital. Therefore, generally, there is an analog method for waveform comparison and a digital method for waveform comparison.

Figure 4:
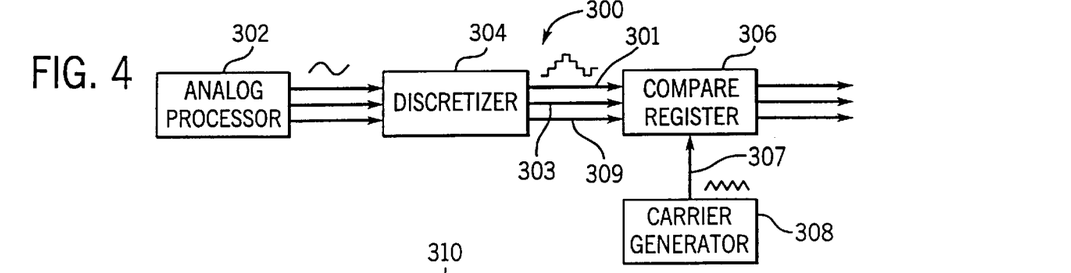
FIG. 4 is a block diagram of an analog controller.

Referring to FIG. 4, a typical analog controller 300 includes a processor 302, a discretizer 304, a compare register 306 and a carrier generator 308. Processor 302 generates three sinusoidal analog command waveforms (one shown in FIG. 3(a)) which are provided to discretizer 304. Discretizer 304 (e.g., an ASIC) samples each command waveform 68 at a frequency much higher than the frequency of carrier waveform 67 and generates three discretized signals on lines 301, 303 and 309.

Figure 5:
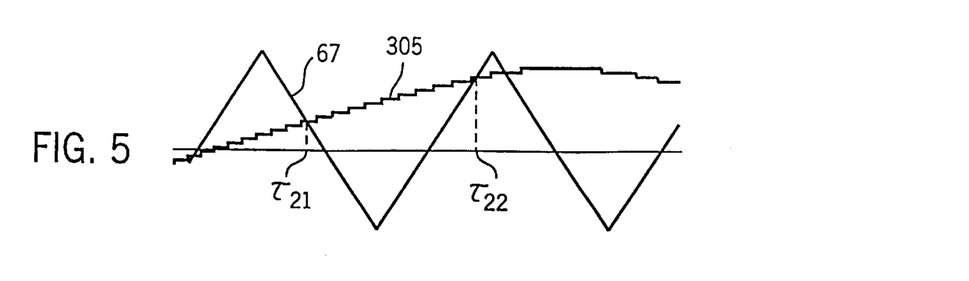
FIG. 5 is a graph similar to FIG. 3(a) albeit showing a carrier waveform and a discretized command signal.

Referring also to FIG. 5, an exemplary discretized signal 305 corresponding to command waveform 68 is illustrated along with carrier waveform 67. Clearly, discretized signal 305 closely tracks waveform 68. The discretized signals are provided to register 306.

Referring still to FIGS. 4 and 5, generator 306 provides carrier signal 67 to register 306 on line 307. Register 306 compares discretized signal 305 to waveform 67 to generate upper switch trigger ON time $\tau_{21}$ and OFF time $\tau_{22}$. Because discretized signal 305 closely tracks waveform 68, times $\tau_{21}$ and $\tau_{22}$ closely approximate ON and OFF times $t_{u1}$ and $t_{o1}$, respectively, in FIG. 3(b).

Figure 6:
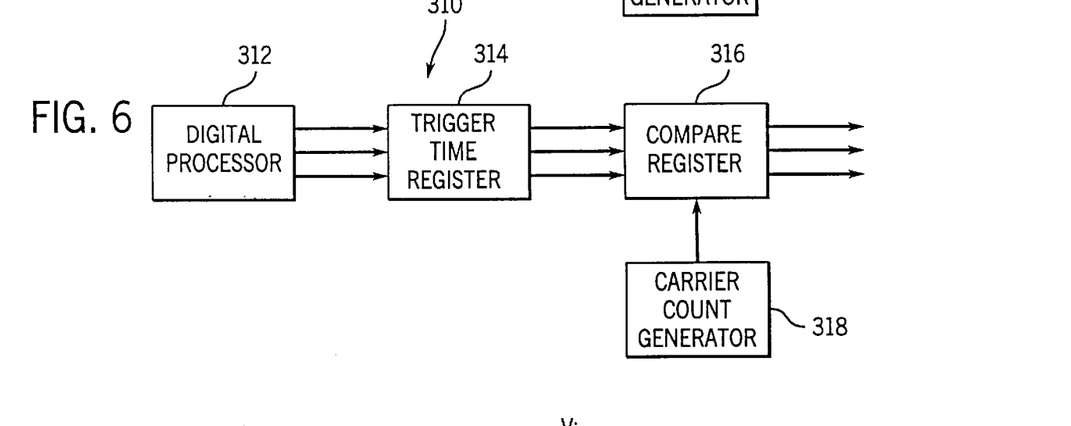
FIG. 6 is a block diagram of a digital controller.

Referring to FIG. 6, a typical digital controller 310 includes a processor 312, a trigger time register 314, a compare register 316 and a carrier count generator 318. Instead of comparing waveforms, controller 310 compares times. Processor 312 generates trigger times. The trigger times approximate turn ON and turn OFF times $t_{u1}$, $t_{o1}$ respectively. Instead of generating a triangle carrier waveform 67 like generator 308 (see FIG. 4), generator 318 provides a carrier count signal to register 316 which is indicative of waveform 67.

Referring again to FIG. 3(a), for the purpose of this explanation, a carrier period $T_c$ is the time between consecutive peak carrier waveform amplitude values $A_{max}$. During a first half $T_n$ of each carrier period $T_c$, the carrier count counts down from a maximum count value $C_{max}$ to a minimum count value $C_{min}$. Similarly, during a second half $T_p$ of each carrier period $T_c$, the count counts up from minimum count $C_{min}$ to maximum count $C_{max}$. To simplify this explanation it will be assumed maximum count $C_{max}$ is 100 and minimum count $C_{min}$ is 0.

An example of how processor 312 operates to generate trigger times is instructive. Referring still to FIG. 3(a), in addition to waveforms 67 and 68, an amplitude signal 71 is also illustrated. Signal 71 is generated internally by processor 312. To generate signal 71, at the beginning of each carrier period $T_c$ processor 312 normalizes waveform 68 to the DC bus voltage $V_{bus}$ so that a waveform 68 amplitude $A_n$ is between +½ and −½. Processor 321 samples command waveform 68 and discretizes amplitude $A_n$ at the beginning of each carrier waveform period $T_c$. In FIG. 3(a), at time $\tau_{17}$ which is the beginning of period $T_c$, amplitude $A_n$ is $A_1$ and therefore signal 71 is set to amplitude $A_1$ for the duration of period $T_c$. At the end of period $T_c$ at time $\tau_{18}$, amplitude $A_n$ is $A_2$ and therefore signal 71 is set to amplitude $A_2$ for the duration of the period following period $T_c$. This process of discretizing waveform 68 to generate signal 71 at the beginning of each carrier period $T_c$ is continuous.

Just after amplitude $A_n$ is set at the beginning of each carrier period $T_c$ and prior to the next intersection between signal 71 and waveform 67, processor 312 determines an upper switch ON duty cycle DC according to the following equation:

$$DC = \left(A_n + \frac{1}{2}\right) \qquad \text{Eq. 1}$$

For example, where $A_n$ is 0.25, duty cycle DC will be 75% (i.e., 0.25+0.50).

Figure 3E:
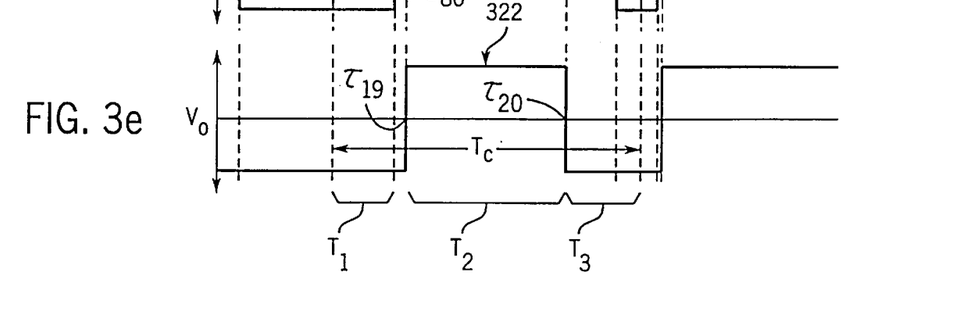

Next, processor 312 determines upper switch trigger times by multiplying duty cycle DC by the maximum carrier count $C_{max}$. Assuming a 75% duty cycle DC, upper switch trigger times occur when the carrier count is 75 (i.e., 0.75*100). Thus, referring to FIGS. 3(a) and 3(e), at time $\tau_{17}$, processor 312 identifies times $\tau_{19}$ and $\tau_{20}$ as the turn ON and turn OFF times of an associated upper switch. In the example, both of times $\tau_{19}$ and $\tau_{20}$ identify counts of 75, time $\tau_{19}$ during period $T_n$ and time $\tau_{20}$ during half period $T_p$. Times $\tau_{19}$ and $\tau_{20}$ corresponding to waveform 68 are provided to register 314 which stores the times. Similarly, other trigger times corresponding to the other two command waveforms (not illustrated) are provided to register 314.

During period $T_c$ registers 316 also receives the carrier count signal for comparison. During first half period $T_n$, as the count counts down from 100 (i.e., $C_{max}$) to 0 (i.e., $C_{min}$), the count reaches time $\tau_{19}$ at 75 and generates an upper switch ON trigger signal. During second half period $T_p$ as the count counts up from 0 to 100, the count reaches time $\tau_{20}$ at 75 and generates an upper switch OFF trigger signal. Thus, referring to FIG. 3(e), with a digital controller which compares trigger times to a carrier count and discretizes waveform amplitude $A_n$ only once per carrier cycle $T_c$, resulting high frequency voltage 322 includes positive phases 323 which are carrier signal centered. In other words, during a first and a third segment $T_1$ and $T_3$, respectively, of period $T_c$, voltage 322 is low, therebetween during a second segment $T_2$, voltage 322 is high and segments $T_1$ and $T_3$ have identical durations.

Referring again to FIG. 1, Insulated Gate Bipolar Transistors (IGBTs) are the latest power semiconductor switches used in a PWM inverter 9. IGBTs have fast rise times and associated switching speeds (e.g. 50–400 ns) that are at least an order of magnitude faster than BJTs and other similar devices. At IGBT switching speeds, switching frequency and efficiency, and the quality of terminal voltages, are all appreciably improved. In addition, the faster switching speeds reduce harmonic heating of the motor winding as well as reduce audible motor lamination noise.

While IGBT PWMs are advantageous for all of the reasons identified above, when combined with certain switch modulating techniques (i.e. certain on/off switching sequences), IGBT fast dv/dt or rise times can reduce the useful life of motor components and/or drive to motor voltage supply lines. In particular, while most motors and supply lines are designed to withstand operation at rated line voltages for long periods and to withstand predictable overvoltage levels for short periods, in many cases, fast switch rise times causes overvoltages that exceed design levels.

For a long time the industry has recognized and configured control systems to deal with twice overvoltage (i.e. twice the PWM inverter DC power supply level) problems. As well known in the controls art, twice overvoltage levels are caused by various combinations of line voltage rise time and magnitude, imperfect matches between line-to-line supply cable and motor surge impedances, and cable length. Line voltage frequency and switch modulating techniques have little effect on twice overvoltage levels.

One common way to cope with twice overvoltage levels has been to reduce reflected voltage by terminating the cable supply lines at the motor terminals with a cable to motor surge impedance matching network. Resistor-Inductor-Capacitor or R-L-C filter networks mounted at the drive output are also used to change and reduce the slope of the voltage pulses (i.e. the turn on times) as they arrive. This network increases the cable distance where twice voltage in the motor terminals is developed to a length outside the application distance of interest. In addition, to reduce the possibility of damage from periodic twice overvoltage levels, most cable supply lines and motors are insulated to withstand periodic twice overvoltage levels. Thus, the industry has developed different system configurations for dealing with twice overvoltage.

Unfortunately, there is another potentially more damaging overvoltage problem that has not been satisfactorily dealt with. The second overvoltage problem is referred to herein as greater than twice overvoltage. Unlike twice overvoltage, greater than twice overvoltage is caused by faster IGBT switching frequencies and faster IGBT dv/dt rise times interacting with two different common switch modulating techniques, that result in overvoltage problems referred to as "double pulsing" and "polarity reversal".

Figure 7:
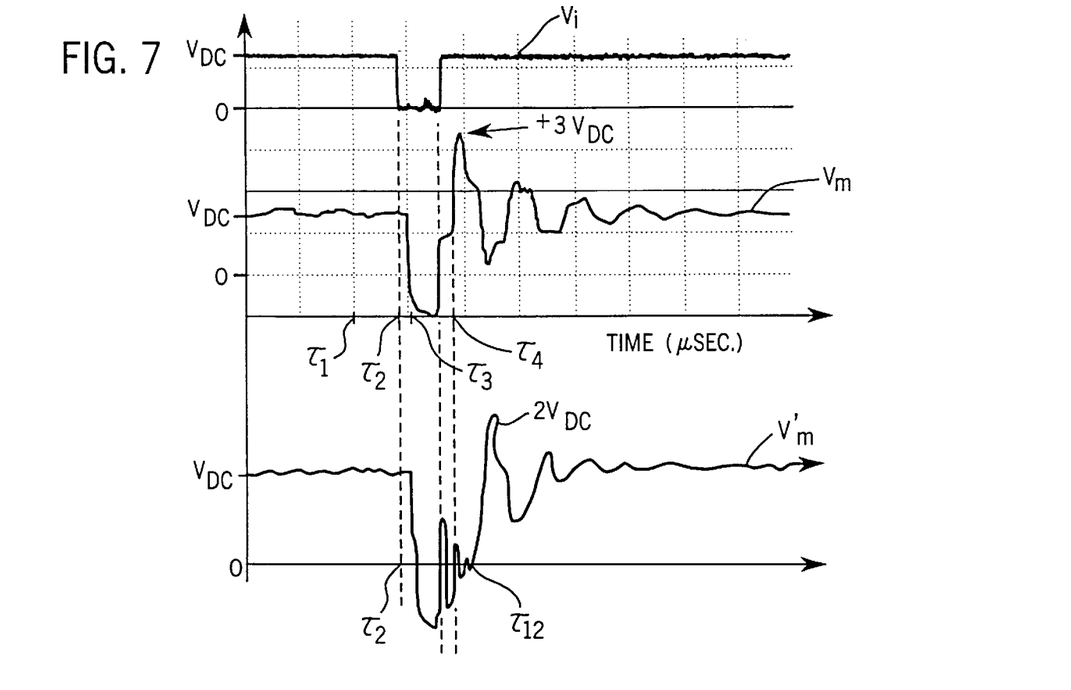
FIG. 7 is a graph illustrating a greater than twice over voltage phenomenon on a motor due to double pulsing and includes an inverter line-to-line voltage generated by PWM firing signals, a resulting uncompensated line-to-line motor voltage of greater than twice voltage magnitude and a compensated line-to-line motor voltage limited to twice over voltage by the described invention.

Referring to FIG. 7, double pulsing will be described in the context of an IGBT inverter generated line-to-line voltage $V_i$ applied to a line cable and a resulting motor line-to-line terminal voltage $V_m$. Initially, at time $\tau_1$, the line is shown in a fully-charged condition ($V_i(\tau_1)=V_m(\tau_1)=V_{DC}$). A transient motor voltage disturbance is initiated in FIG. 7 by discharging the line at the inverter output to zero voltage, starting at time $\tau_2$, for approximately 4 μsec. The pulse propagation delay between the inverter terminals and motor terminals is proportional to cable length and is approximately 1 μsec for the assumed conditions. At time $\tau_3$, 1 μsec after time $\tau_2$, a negative going $V_{DC}$ voltage has propagated to the motor terminals. In this example, a motor terminal reflection coefficient $\lceil_m$ is nearly unity. Thus, the motor reflects the incoming negative voltage and forces the terminal voltage $V_m$ to approximately negative bus voltage:

$$V_m(\tau_3)=V_m(\tau_1)-V_{DC}(1+\lceil_m)\approx -V_{DC} \qquad \text{Eq. 2}$$

A reflected wave ($-V_{DC}$) travels from the motor to the inverter in 1 μsec and is immediately reflected back toward the motor. Where an inverter reflection coefficient $\lceil_i$ is approximately negative unity, a positive $V_{DC}$ pulse is reflected back toward the motor at time $\tau_4$. Therefore, at time $\tau_4$ the discharge at time $\tau_2$ alone causes a voltage at the motor terminal such that:

$$V_m(\tau_4)=V_m(\tau_1)-V_{DC}(1+\lceil_m)-V_{DC}\lceil_i\lceil_m(1+\lceil_m)\approx V_{DC} \quad \text{Eq. 3}$$

In addition, at time $\tau_4$, with the motor potential approaching $V_{DC}$ due to the $\tau_2$ discharge, the inverter pulse $V_i(\tau_4)$ arrives and itself recharges the motor terminal voltage to $V_{DC}$. Pulse $V_i(\tau_4)$ is reflected by the motor and combines with $V_m(\tau_4)$ to achieve a peak value of approximately three times the DC rail value:

$$V_m(\tau_4+)=V_m(\tau_1)-V_{DC}(1+\lceil_m)-V_{DC}\lceil_i\lceil_m(1+\lceil_m)+V_i(\tau_4)(1+\lceil_m)\approx 3V_{DC} \quad \text{Eq. 4}$$

Figure 8:
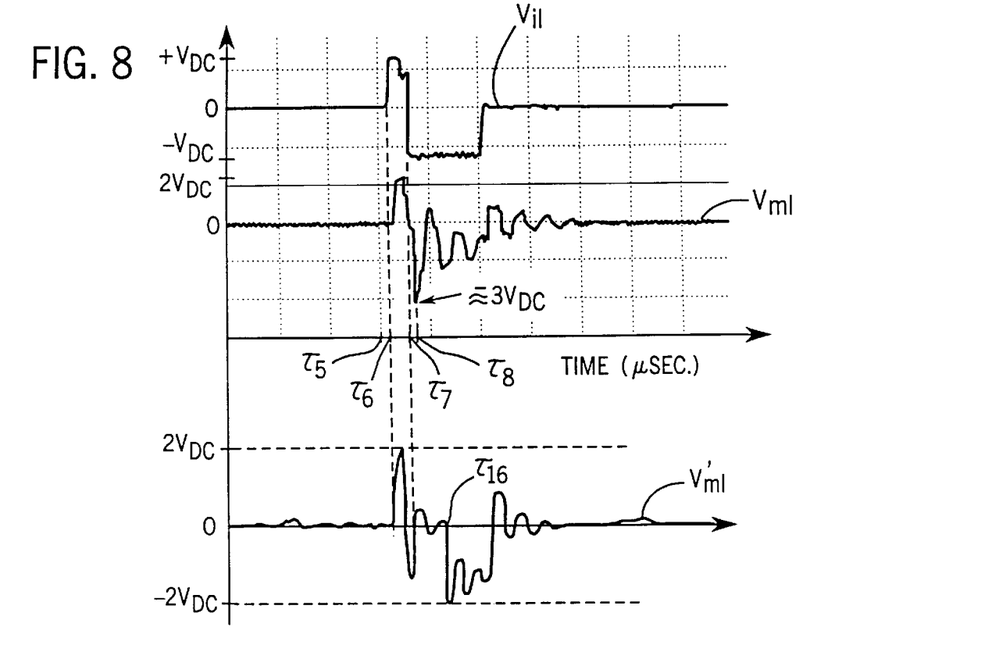
FIG. 8 is a graph illustrating greater than twice over voltage due to an inverter modulator plurality reversal problem and includes an inverter lint-to-line voltage generated by a PWM modulator firing signal, a resulting uncompensated line-to-line motor voltage of greater than twice voltage magnitude and a compensated line-to-line motor voltage limited to twice over voltage by the invention.

Referring to FIG. 8 polarity reversal will be described in the context of an IGBT inverter generated line-to-line voltage $V_{il}$ and a resulting motor line-to-line voltage $V_{ml}$. Polarity reversal occurs when the firing signal of one supply line is transitioning into overmodulation while the firing signal of another supply line is simultaneously transitioning out of overmodulation. Overmodulation occurs when a reference signal magnitude is greater than the maximum carrier signal magnitude so that the on-time or off-time of a switch is equal to the duration of the carrier period. Polarity reversal is common in all types of PWM inverter control.

Initially, the inverter line-to-line voltage $V_{il}(\tau_5)$ is zero volts. At time $\tau_6$, the inverter voltage $V_{il}(\tau_6)$ is increased to $V_{DC}$ and, after a short propagation period, a $V_{DC}$ pulse is received and reflected at the motor terminals thus generating a $2V_{DC}$ pulse across associated motor lines. At time $\tau_7$, the line-to-line voltage switches polarity (hence the term polarity reversal) so that the inverter voltage $V_{il}(\tau_7)$ is equal to $-V_{DC}$ when the line-to-line motor voltage $V_{ml}(\tau_7)$ has not yet dampened out to a DC value (i.e. may in fact be $2V_{DC}$). After a short propagation period, the $-2V_{DC}$ pulse reaches the motor, reflects, and combines with the inverter reflected pulse $-V_{DC}$ its reflected pulse and the positive voltage $2V_{DC}$ on the motor. The combination generates an approximately $-4V_{DC}$ line-to-line motor voltage $V_{ml}(\tau_8)$ at time $\tau_8$.

In reality, the amplitude of overvoltages will often be less than described above due to a number of system variables including line AC resistance damping characteristics, DC power supply level, pulse dwell time, carrier frequency $f_c$, modulation techniques, and less than unity reflection coefficients ($\lceil_m$).

One solution to the double pulsing problem has been to increase the zero voltage dwell time between line-to-line inverter pulses. In other words, referring again to FIG. 7, the discharge time between pulses would be extended from the present 4 $\mu$secs so that, prior to the second pulse $V_i(\tau_4)$ reaching the motor terminals, the motor terminal voltage transient $V_m$ reaches a steady state DC value.

Figure 9:
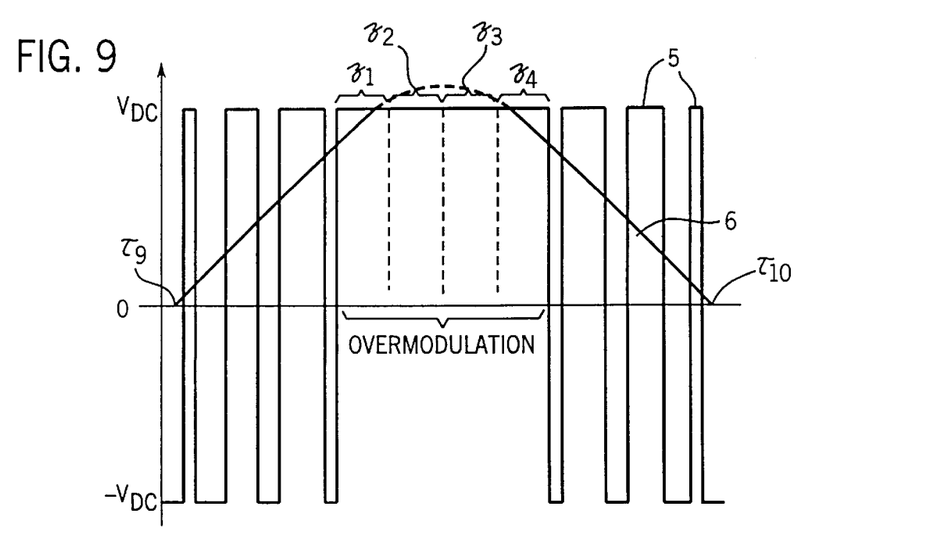
FIG. 9 is a graph illustrating high frequency pulse width modulating voltage pulses and a resulting low frequency fundamental terminal voltage.

While increasing the zero voltage dwell time between line-to-line inverter pulses eliminates greater than twice overvoltage due to double pulsing, this solution can disadvantageously reduce the amplitude of the resulting fundamental low frequency terminal voltage where high carrier frequencies and overmodulation occurs. For example, referring to FIG. 9, a series of high frequency voltage pulses 5 at a motor terminal and a resulting fundamental low frequency terminal voltage 6 can be observed. In FIG. 9, a positive phase of the low frequency voltage begins at time $\tau_9$ and ends at time $\tau_{10}$.

To eliminate greater than twice over voltage, one pulse limiting scheme indiscriminately increases the duration of each off time period that is less than a minimum allowable off time. In FIG. 9, the off times of pulses during periods $\zeta_2$ and $\zeta_3$ are equal to associated carrier periods and therefore are greater than the maximum on time and thus would both be limited. In addition, in many cases greater than twice over voltage will occur prior to and just after overmodulation. Thus, referring still to FIG. 9, during periods $\zeta_1$ and $\zeta_4$ and periods just before period $\zeta_1$ and just after period $\zeta_4$, off times will also often be limited. Where the magnitude of the DC power supply is reduced substantially, the number of overmodulation carrier periods having limited on-times increases proportionally until, at some point, the reduced on-time noticeably affects the low frequency terminal voltage magnitude. In other words, maximum power output is substantially reduced through blind limitation of firing pulses during overmodulation.

While FIG. 9 is only exemplary, it can be seen that during the positive phase (i.e. $\tau_9-\tau_{10}$), the four firing pulses that would normally occur during carrier periods $\zeta_1-\zeta_4$ would likely all be limited to a maximum on-time. In addition, pulses during periods just before period $\zeta_1$ and just after period $\zeta_4$ may also be limited. In many cases, especially where the DC supply magnitude is minimal or reduced, the reduction in low frequency terminal voltage is unacceptable.

In addition to reducing the magnitude of the fundamental low frequency voltage 6, this solution does not address the polarity reversal problem.

Another solution to the greater than twice overvoltage problem is described in U.S. patent application Ser. No. 08/701,950 entitled METHOD AND APPARATUS FOR CONTROLLING VOLTAGE REFLECTIONS USING A MOTOR CONTROLLER which was filed on Aug. 23, 1996 and is commonly owned with this application. According to this solution a motor controller monitors switch trigger times during future carrier periods and modifies trigger times in a manner calculated to eliminate switching sequences which will yield greater than twice overvoltage. When the period between consecutive upper switch ON and OFF trigger times is less than the period required for a substantially steady state voltage level to be reached, trigger times are modified such that the period between the consecutive ON and OFF trigger times is increased. Where trigger times result in greater than twice overvoltage due to polarity reversal, the trigger times are altered to eliminate the possibility of greater than twice overvoltage.

The described method requires a processor which can (1) identify ON and OFF periods during future carrier periods, (2) compare ON and OFF period durations to a duration which is known to cause greater than twice overvoltage and (3) can then modify the ON and OFF periods when necessary to eliminate greater than twice overvoltage.

On one hand, as described above, digital processors identify ON and OFF trigger times during each carrier period and therefore can modify trigger times when necessary.

However, on the other hand, as described above, analog processors simply generate analog command signals for real time comparison to a carrier signal. Thus, analog processors are incapable of looking ahead to identify ON and OFF periods during future carrier periods as required. For this reason, analog processors cannot in and of themselves modify turn ON and turn OFF times.

In addition, it should also be noted that, even where a controller includes a digital processor, because most processors are not configured to facilitate large numbers of calculations in addition to typical calculations required to generate trigger times, many digital processors may not be able to implement the method described in the above referenced patent. This is particularly true of inexpensive and relatively simple processors.

Therefore, it would be advantageous to have an apparatus for use with a PWM controller which includes an analog processor which can eliminate greater than twice overvoltage. In addition, it would be advantageous to have an apparatus for use with a PWM controller which includes a digital processor which can eliminate greater than twice overvoltage without requiring the processor to perform excessive calculations.

BRIEF SUMMARY OF THE INVENTION

The present invention provides an apparatus which cooperates with an analog processor to modify ON and OFF periods of high frequency voltage pulses provided to a motor terminal to eliminate greater than twice overvoltage. A primary object of the invention is to provide a hardware construct which can be used with a controller including an analog processor to eliminate greater than twice overvoltage. The present invention does this by receiving upper switch trigger signals and, each time a signal goes high, maintaining the signal high for at least the critical dwell time wherein the critical dwell time has a duration which will not cause greater than twice overvoltage. Similarly, each time a signal goes low, the invention maintain the signal low for at least the critical dwell time. The invention eliminates the need to identify turn ON and OFF times during future carrier periods and therefore can be implemented using an analog processor.

Another object is to provide an apparatus which reduces the number of required processor calculations. A related object is to provide an apparatus which can be used to eliminate greater than twice overvoltage with a relatively simple and inexpensive digital processor. By providing a hardware construct to eliminate greater than twice overvoltage, the present invention can be used with any controller independent of processor capabilities.

The invention includes an apparatus for use with a pulse width modulating controller, a PWM inverter and a three phase motor, the controller providing three trigger signals for controlling the inverter, the trigger signals alternating between high and low states, the inverter providing exciting motor voltages for driving the motor. The apparatus is for substantially eliminating exciting motor voltage greater than twice the maximum intended amplitude by, when a trigger signal is not in over modulation, modifying the trigger signal to provide a modified trigger signal having ON and OFF times at least as long as a critical dwell time where the critical dwell time is the smallest period which will eliminate greater than twice the maximum intended amplitude. The apparatus comprises first, second and third correction modules, a separate correction module for each of the three motor phases, each correction module receiving a separate trigger signal. Each module includes a first pulse module which receives the trigger signal and, when the trigger signal changes from a first state to a second state, provides a first pulse signal at the second state which remains at the second state for a period equal to the greater of the critical dwell time duration and the duration of the second state trigger signal, a second pulse module which, when the first pulse signal changes from the second state to the first state, provides a second pulse signal at the first state which remains at the first state for a period equal to the critical dwell time duration and a first summer which receives the first pulse signal and the second pulse signal and when both the first and second pulse signals are at the second state, provides a modified trigger signal at the second state and provides a modified trigger signal at the first state at all other times.

Preferably, the first pulse module is a minimum pulse module, the second pulse module is a maximum pulse module, the first state is low and the second state is high. Also, preferably, the controller also provides a timing signal, and the apparatus also includes a clock register, the timing signal is received by the clock register, the clock register providing a clock signal which alternates between high and low each time the timing signal changes from low to high, the clock signal provided to the minimum pulse module and the maximum pulse module.

In one aspect the minimum pulse module includes a first enabler, a first counter and a second summer, the first counter programmed with a first counter count equal to the critical dwell time, the first enabler receiving the trigger signal and the clock signal, when the trigger signal changes from low to high the first enabler providing a high minimum duration signal and a first clock signal until the trigger signal is low and the first enabler is reset, when provided, the first clock signal equal to the clock signal, the first counter receiving the first clock signal and, each time the first clock signal changes from low to high, decrementing the first count. When the first count is equal to zero, the first enabler is reset and the first count is reset to equal the critical dwell time. The second summer receives the minimum duration signal and the trigger signal and, when one or both of the minimum duration and trigger signals is high, provides a high minimum pulse signal. The maximum pulse module includes a second enabler and a second counter, the second counter programmed with a second counter count equal to the critical dwell time, the second enabler receiving the minimum pulse signal and the clock signal, when the minimum pulse signal changes from high to low, the second enabler providing a low maximum pulse signal and a second clock signal until the second enabler is reset, when provided, the second clock signal equal to the clock signal. The second counter receives the second clock signal and, each time the second clock signal changes from low to high, decrements the second count and, when the second count is equal to zero, resets the second enabler and resets the second count to the critical dwell time.

In another aspect the first enabler includes first and second registers and a third summer, the first register receiving the trigger signal and providing the minimum duration, the third summer receiving the minimum duration signal and the clock signal and generating a high first clock signal when the clock signal and the minimum duration signal are high, the first counter providing a first counter output signal which indicates when the first count equals zero, the second register receiving the first counter output signal and resetting the first register and the first count when the first counter output signal indicates that the first count is equal to zero.

In another aspect, the second enabler includes a third register, the second counter providing a second counter output which indicates when the second count equals zero, the third register receiving the second counter output signal and resetting the second count when the second counter output signal indicates that the second count is equal to zero.

In yet another aspect, the first counter provides a low first counter output signal when the first count equals zero and provides a high first counter output signal at all other times and the second counter a low second counter output signal when the second count equals zero and provides a high second counter output signal at all other times.

Preferably, the maximum pulse module further includes a fourth summer, a fifth summer, first, second and third inverters and a fourth register, the first inverter receives and inverts the second counter output signal providing a first inverter signal, the fourth register receives the first inverter signal and provides the maximum pulse signal, the fourth summer receives the modified trigger signal and the maximum pulse signal and provides a fourth summer output signal, the fourth summer output signal high when both the maximum pulse signal and the modified trigger signal are low and low under all other conditions, the fourth summer output signal linked to the fourth register, the maximum pulse output signal set equal to the first inverter signal when the fourth summer output signal is high, the second inverter receiving and inverting the maximum pulse output signal providing a second inverter signal, the third inverter receiving and inverting the modified trigger signal providing a third inverter signal, the fifth summer receiving the second and third inverter signals and the clock signal, when each of the second and third inverter signals is high, the fifth summer providing the second clock signal equal to the clock signal.

Also, preferably, the second enabler further includes a fourth inverter, a sixth summer, a seventh summer, an eighth summer, a ninth summer, a fifth register and a sixth register, the fourth inverter receiving and inverting the minimum pulse signal providing a fourth inverter signal, the fifth register receiving the minimum pulse signal and the timing signal and providing a fifth register output signal which is updated to equal the minimum pulse signal each time the timing signal changes from low to high, the sixth summer receiving the timing signal and the minimum pulse signal and, when both the timing signal and the minimum pulse signal are high, providing a high sixth summer signal, the sixth register receiving the maximum pulse signal, the fifth register output signal and the sixth summer signal and providing a sixth register output signal, the sixth register output signal updated to equal to maximum pulse signal each time the fifth register output signal is low and the sixth summer signal changes from low to high, the seventh summer receiving both the sixth register output signal and the fourth inverter signal and providing a seventh summer signal, when both the sixth register output signal and the fourth inverter signal are high, the seventh summer providing a high seventh summer signal, the eighth summer receiving the seventh summer signal and the fourth summer signal and providing an eighth summer signal, the eighth summer signal high when one or both of the seventh summer signal or the fourth summer signal is high, the ninth summer receiving the timing signal and the eighth summer signal and providing a ninth summer signal, the ninth summer signal high when both the timing signal and the eighth summer signal are high, the fourth register providing the first inverter signal as the maximum pulse signal when the ninth summer output changes from low to high.

The first, third, fifth, sixth, seventh, and ninth summers are preferably logical AND gates, the second and eighth summers are preferably logical OR gates and the fourth summer is preferably a logical OR gate with an inverted output.

To allow a user to modify the critical dwell time, the apparatus may also be equipped with a latch which is linked to the first and second counters. To maintain low cost, the first, second, third, fourth, fifth and sixth registers are DQ flip flops and the clock register is a JK flip flop.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and therefore reference is made to the claims herein for interpreting the scope of the invention.

BRIEF DESCRIPTION OF THE SEVERAL VIEWS OF THE DRAWINGS

FIG. 3(a) is a graph illustrating the waveforms used by a PWM inverter to produce the high frequency pulses shown in FIG. 2, FIGS. 3(b) and 3(c) are graphs illustrating PWM trigger signals

DETAILED DESCRIPTION OF THE INVENTION

A. Hardware

Figure 10:
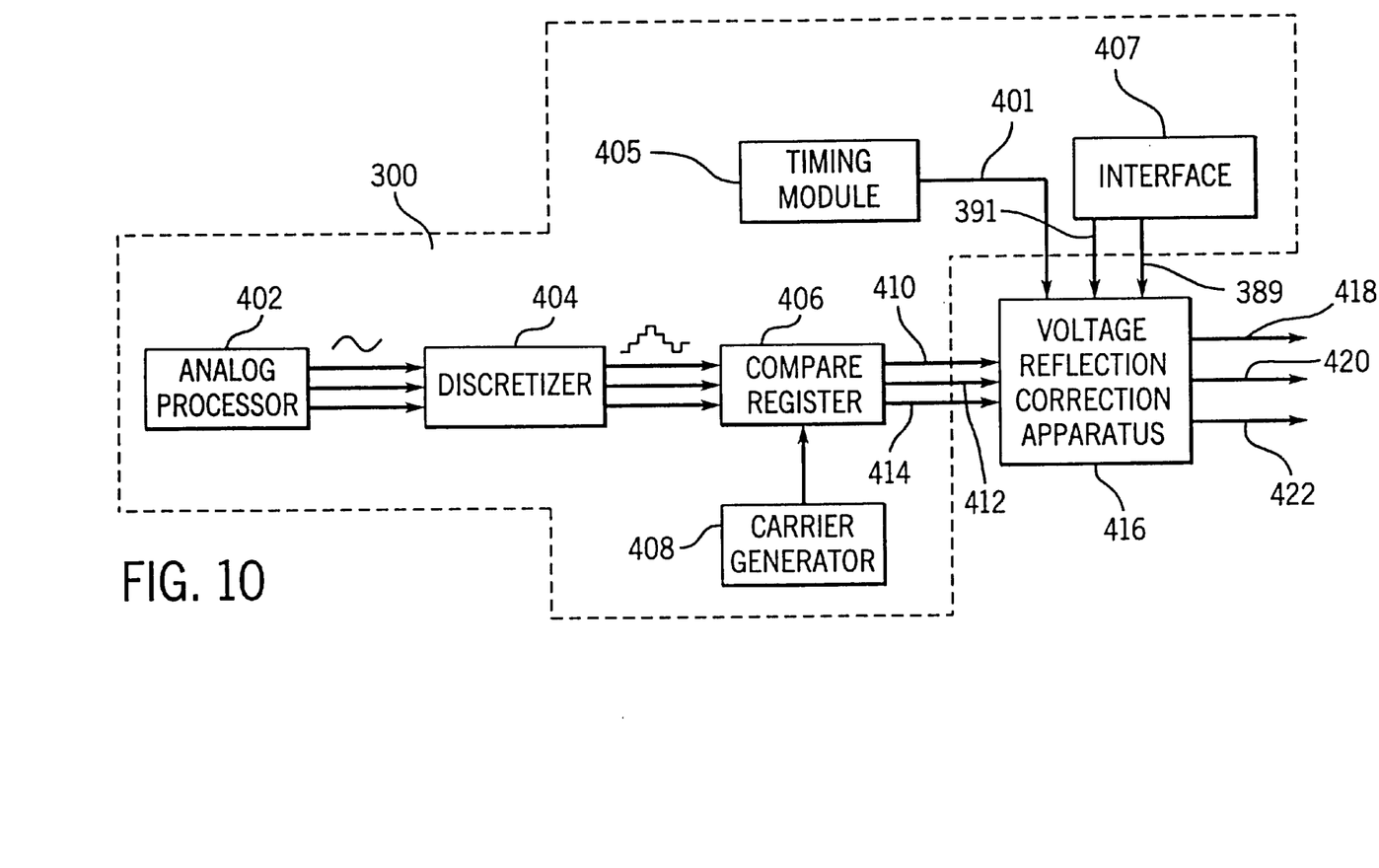
FIG. 10 is a block diagram of a controller including the inventive voltage reflection correction apparatus.

Referring to FIG. 10, the present invention will be described in a context of a conventional motor controller 300 including an analog processor 402, a discretizer 404, a compare register 406 and a carrier generator 408. Analog processor 402 provides three sinusoidal command waveforms to discretizer 404. Discretizer 404 discretizers the amplitudes of the sinusoidal command waveforms and provides discretized signals to compare register 406. As described in more detail above, an exemplary discretized signals 305 appears in FIG. 5. Carrier generator 408 provides carrier waveform 67 (see FIG. 5) to compare register 406. Compare register 406 compares waveform 67 to signal 305 and the other two discretized signals (not illustrated) and generates trigger signals on lines 410, 412 and 414 to be used for PWM control. All of the hardware described above is known and conventional.

According to the present invention, a voltage reflection correction apparatus 416, a timing module 405 and an interface 407 are provided. Timing module 405 is a clock which provides a timing signal to apparatus 416 via a line 401 while interface 407 allows a user to program apparatus 416 with a specific critical dwell time via a line 389.

Interface 407 is also linked to apparatus 416 via a load line 391. Interface 407 can take many forms, a preferred form being a numeric key pad including an ENTER key. A dwell time is entered via the pad and is provided to apparatus 416 when the ENTER key is struck.

Correction module 416 receives the trigger signals on lines 410, 412 and 414 and modifies those trigger signals to provide modified trigger signals which do not generate greater than twice overvoltage. The modified trigger signals are provided on lines 418, 420 and 422. As known in the art, the modified trigger signals are provided to a deadtime compensator (not illustrated) for further processing prior to controlling an inverter.

Apparatus 416 includes three separate and parallel correction modules, a separate module corresponding to each of lines 410, 412 and 414 and hence corresponding to a separate one of inverter legs 39, 40 and 41. As each correction module is constructed and operates in essentially the same manner, only the module associated with line 410 and leg 39 will be explained here in detail.

Figure 11:
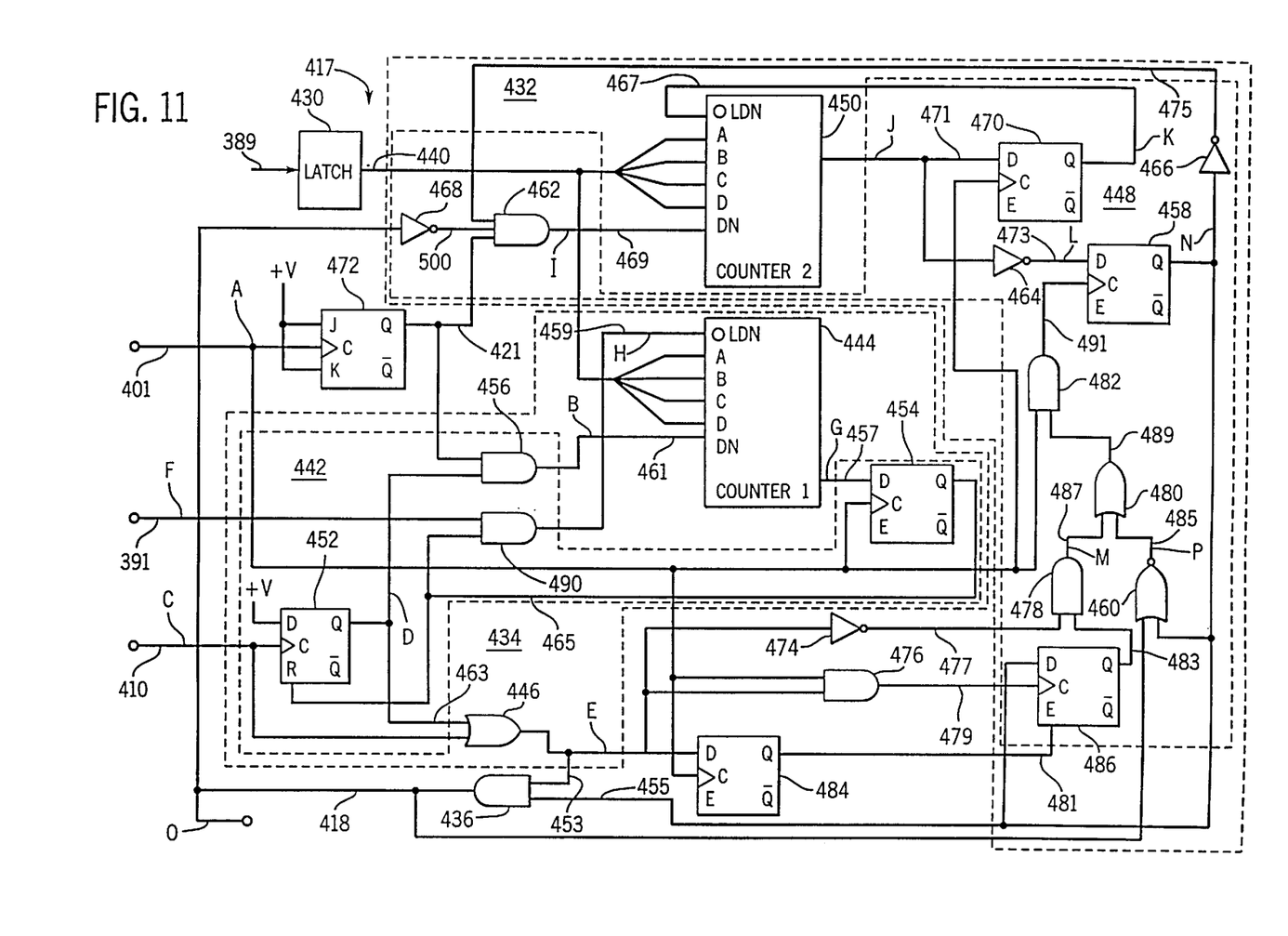
FIG. 11 is a circuit diagram detailing the correction apparatus of FIG. 10.

Referring now to FIG. 11, the details of a correction module 417 associated with line 410 and leg 39 are provided in schematic form. Generally, module 417 includes a latch 430, a maximum pulse module 432, a minimum pulse module 434, a clock register 472 and a first summer in the form of a logical AND gate 436.

Latch 430 is essentially a memory means. To this end, when a dwell time $T_\alpha$ is entered by a user via interface 407 and line 389, time $T_\alpha$ is provided to and stored within latch 430. Latch 430 provides time $T_\alpha$ via a data bus 440 to both the maximum pulse module 432 and a minimum pulse module 434.

Clock register 472 is preferably a J and K flip flop with an input terminal J, an input terminal K, a clock terminal C and a single output terminal Q. The timing signal on line 401 is provided to clock terminal C. Both input terminals J and K are connected to a positive voltage source +V. When so configured, output terminal Q provides a clock signal on line 421 which alternates between high and low each time the timing signal on line 401 changes from low to high. In other words, the clock signal period on line 421 is twice as long as the timing signal period on line 401.

The minimum pulse module 434 generates a minimum pulse signal as an output on line 453. Similarly, the maximum pulse module 432 generates a maximum pulse signal as an output on line 455. First summer 436, a conventional logical AND gate, receives both the minimum pulse signal on line 453 and the maximum pulse signal on line 455 and provides the modified trigger signal on line 418. AND gate 436 provides a high modified trigger signal on line 418 only when both the minimum pulse signal and the maximum pulse signal are high and provides a low modified trigger signal under all other conditions.

Minimum pulse module 434 receives both the trigger signal on line 410 and the clock signal on line 421 and, when the trigger signal changes from low to high, generates a minimum pulse signal on line 453 which remains high for a duration equal to the greater of critical dwell time $T_\alpha$ and the period during which the trigger signal remains high. Similarly, maximum pulse module 432 received the minimum pulse signal on line 453 and, each time the minimum pulse signal on line 453 changes from high to low, maintains the maximum pulse signal on line 455 low for a duration equal to the critical dwell time $T_\alpha$. When the maximum and minimum pulse signals are combined via AND gate 436, the resulting modified trigger signal has consecutive ON and OFF times such that greater than twice overvoltage is eliminated.

Referring still to FIG. 11, to generate the desired minimum pulse signal on line 453, minimum pulse module 434 generally includes a first enabler including components collectively referred to by numeral 442, a first counter 444 and a second summer 446.

The second summer 446 is preferably a conventional logical OR gate having two inputs, a first input connected to line 410 receiving the trigger signal and a second input connected to line 463. The first enabler 442 and first counter 444 cooperate to provide a signal on line 463. When the trigger signal on line 410 changes from low to high, enabler 442 and counter 444 cause the signal on line 463 to change from low to high and maintain the signal on line 463 high for a duration equal to critical dwell time $T_\alpha$. Therefore, when the signal on line 463 and the trigger signal on line 410 are ORed together by gate 446, the minimum pulse signal on line 453, remains high for a period equal to the greater of the critical dwell time and the period over which the trigger signal remains high.

Counter 444 includes six input terminals including a load terminal LDN, four data terminals referred to by the letters A, B, C and D and a count terminal DN. In addition, counter 444 includes an output terminal linked to line 457. Load terminal LDN is inverted and is linked to first enabler 442 via a line 459. Terminals A through D are linked via bus 440 to latch 430 such that the critical dwell time stored in latch 430 can be downloaded into counter 444 when the signal provided to load terminal LDN changes from high to low. Each time dwell time $T_\alpha$ is loaded into counter 444, a first count signal is set equal to time $T_\alpha$. A first counter output signal on line 457 is high until the first count is equal to zero at which point the output signal goes low for a short period. Count terminal DN is linked to first enabler 442 via a line 461. Each time the signal on line 461 changes from low to high, counter 444 decrements the first count by one until the first count is equal to zero.

First enabler 442 receives the trigger signal on line 410 and, when the trigger signal changes from low to high, changes the signal on line 463 from low to high. In addition, when the trigger signal changes from low to high, enabler 442 provides the clock signal to count terminal DN of counter 444. Thus, when the trigger signal changes from low to high, counter 444 decrements the first count once every clock signal cycle until the first count is equal to zero. When the first count equals zero, counter 444 generates a brief low pulse on line 457. When the low pulse is generated on line 457, enabler 442 does two things. First, enabler 442 causes the signal on line 463 to change from high to low. Second, enabler 442 provides a low signal at load terminal LDN of counter 444 reloading critical dwell time $T_\alpha$ via terminals A through D.

First enabler 442 includes a first register 452, a second register 454, a third summer 456 and a load summer 490. First register 452 is a conventional DQ flip flop including a reset terminal R, a clock terminal C, an input terminal D and an output terminal Q. Line 410 provides the trigger signal to clock terminal C. Input terminal D is tied to a positive voltage source +V. Reset terminal R is linked to second register 454 as will be explained in more detail below. When the signal at reset terminal R goes low, enable signal D is reset low and remains low until the trigger signal again goes high. Output terminal Q provides the first enable signal on line 463.

Third summer 456 is preferably a logical AND gate having two inputs and a single output connected to line 461. AND gate 456 receives both the signal on line 463 and the clock signal via line 421 and when the signal on line 463 is high, provides the clock signal as a third summer output signal on line 461.

Second register 454 is also a DQ flip flop having a reset terminal R, a clock terminal C, an input terminal D and an output terminal Q. Terminal R is always high so that the signal at terminal Q always follows the signal at input terminal D. Clock terminal C is linked to line 401 and therefore receives the timing signal from module 405. The D terminal is linked to line 457 and therefore receives the first counter output signal. Output terminal Q is linked to reset terminal R of register 452.

Load summer 490 is also a logical AND gate having two inputs and a single output which is linked to line 459. AND gate 490 receives a load signal from interface 407 via line 391 and the second register output signal via line 465.

Referring still to FIG. 11, maximum pulse module 432 includes a second enabler and a second counter 450. Second counter 450, like first counter 444, includes six input terminals and a single output terminal. The six input terminals include a load terminal LND, data terminals A, B, C and D and a count terminal DN. Load terminal LDN is linked to second enabler 448 via line 467. Count terminal DN is linked to second enabler 448 via line 469. Data terminals A through D are linked via bus 440 to latch 430 such that critical dwell time $T_\alpha$ stored in latch 430 can be downloaded into counter 450 when the signal provided to load terminal LDN changes from high to low. Counter 450 includes an internal count referred to herein as the second count. Each time the signal provided to terminal LDN goes low, time $T_\alpha$ is downloaded into counter 450 and the second count is set equal to time $T_\alpha$. The output of second counter 450 is generally high, and goes low for a short period when the second count equals zero. The second counter output signal is provided on line 471 to second enabler 448.

With the second count set equal to time $T_\alpha$, second enabler 448 receives the minimum pulse signal via line 453. When the minimum pulse signal changes from high to low, the second enabler 448 does two things. First, the second enabler 448 causes the maximum pulse signal on line 455 to instantaneously change from high to low. Second, the second enabler 448 provides the clock signal to count terminal DN via line 469. Each time the clock signal changes from low to high, counter 450 decrements the second count.

When the second count reaches zero the second counter output signal on line 471 briefly changes from high to low and second enabler 448 does two things. First, enabler 448 causes the maximum pulse signal on line 455 to change from low to high. Second, enabler 448 changes the signal on line 467 from high to low causing counter 450 to reset the second count equal to time $T_\alpha$.

Second enabler 448 includes a third register 470, a fourth register 458, a fifth register 484, a sixth register 486, a fourth summer 460, a fifth summer 462, a sixth summer 476, a seventh summer 478, an eighth summer 480, a ninth summer 482, a first inverter 464, a second inverter 466, a third inverter 468 and a fourth inverter 474.

Third register 470 is preferably a DQ flip flop having a high reset terminal R, a clock terminal, an input terminal D and an output terminal Q. Clock terminal C is connected to line 401 and thereby receives the timing signal. Input terminal D is linked to line 471 and thereby receives the second counter output signal. Output terminal Q is linked via line 467 to load terminal LDN of counter 450. Thus, when the second count equals zero and the second counter output signal goes low, output terminal Q of register 470 goes low thereby resetting the second count to time $T_\alpha$ via load terminal LDN.

First inverter 464 receives the second counter output signal via line 471 and inverts that signal providing a first inverter signal on line 473.

Fourth register 458 is also a DQ flip flop having a high reset terminal R, a clock terminal C, an input terminal D and an output terminal Q. Clock terminal C is linked to a configuration of logic components which will be described in more detail below. Input terminal D receives the first inverter signal via line 473. Output terminal Q provides a fourth register output signal on line 455. The fourth register output signal is the maximum pulse signal.

The second inverter 466 receives the maximum pulse signal on line 455 and inverts that signal providing a second inverter signal on line 475.

Third inverter 468 receives the modified trigger signal on line 418 and inverts that signal providing a third inverter signal on line 500.

Fourth inverter 474 receives the minimum pulse signal on line 453 and inverts the minimum pulse signal providing a fourth inverter signal on line 477.

Sixth summer 476 is a logical AND gate including two inputs and a single output. AND gate 476 is linked to line 401 and receives the timing signal therethrough as a first input. In addition, gate 476 receives the minimum pulse signal via line 453. When both of its inputs are high, gate 476 provides a high sixth summer signal on line 479.

Fifth register 484 is preferably a DQ flip flop having a high reset terminal, a clock terminal C, an input terminal D and an output terminal Q. Register 484 input terminal D is connected to line 453 and thereby receives the minimum pulse signal. Clock terminal C is linked to line 401 and thereby receives the timing signal. Output terminal Q is linked to a line 481 and provides a fifth register output signal.

Sixth register 486 is also a conventional DQ flip flop including a reset terminal R, a clock terminal C, an input terminal D and an output terminal Q. Reset terminal R of register 486 is connected to line 481 and therefore receives the fifth register output signal. Register 486 resets its output signal on line 483 low each time the signal at reset terminal R is low. Clock terminal C is linked to line 479. Input terminal D is linked to line 455 and thereby receives the maximum pulse signal. Output terminal Q provides a sixth register output signal on line 483.

Fourth summer 460 is a logical OR gate receiving the modified trigger signal via line 451 and the maximum pulse signal via line 455 and providing a single inverted output signal as a fourth summer output signal on line 485. When either one or both of its input signals are high, gate 460 generates a low output signal on line 485. When both of its input signals are low, gate 460 provides a high output signal on line 485.

Seventh summer 478 is a conventional logical AND gate receiving the fourth inverter signal and the sixth register output signal via lines 477 and 483, respectively, and provides a single output on line 487. When both of its inputs are high, gate 478 provides a high seventh summer output signal on line 487. Under all other conditions, gate 478 provides a low output signal.

Eighth summer 480 is a logical OR gate receiving the output signals of summers 478 and 460, and providing a single eighth summer output signal on line 489. When one or both of its input signals are high, gate 480 provides a high output signal on line 489. When both of its input signals are low, gate 480 provides a low output signal.

Ninth summer 482 is a logical AND gate receiving the timing signal via line 401 and the eighth summer output signal via line 489 and providing a single output signal on line 491. When both of its inputs are high, gate 482 provides a high output signal on line 491 and under all other conditions provides a low output signal. The ninth summer output signal on line 491 is provided to the clock terminal C of register 458.

B. Operation

Figure 12A:
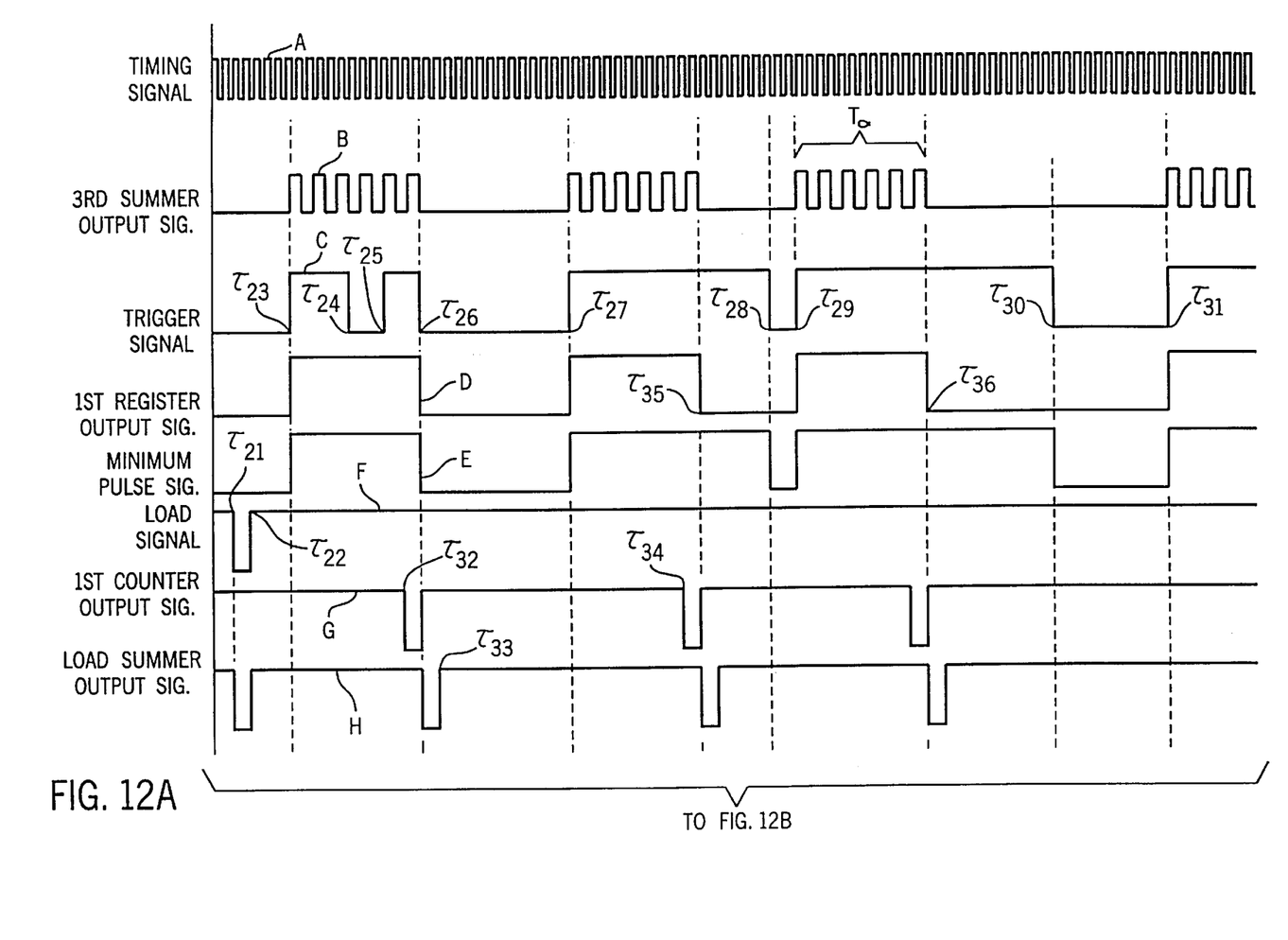
FIG. 12 is a timing diagram illustrating various signals received and generated by the circuit illustrated in FIG. 11.
Figure 12B:
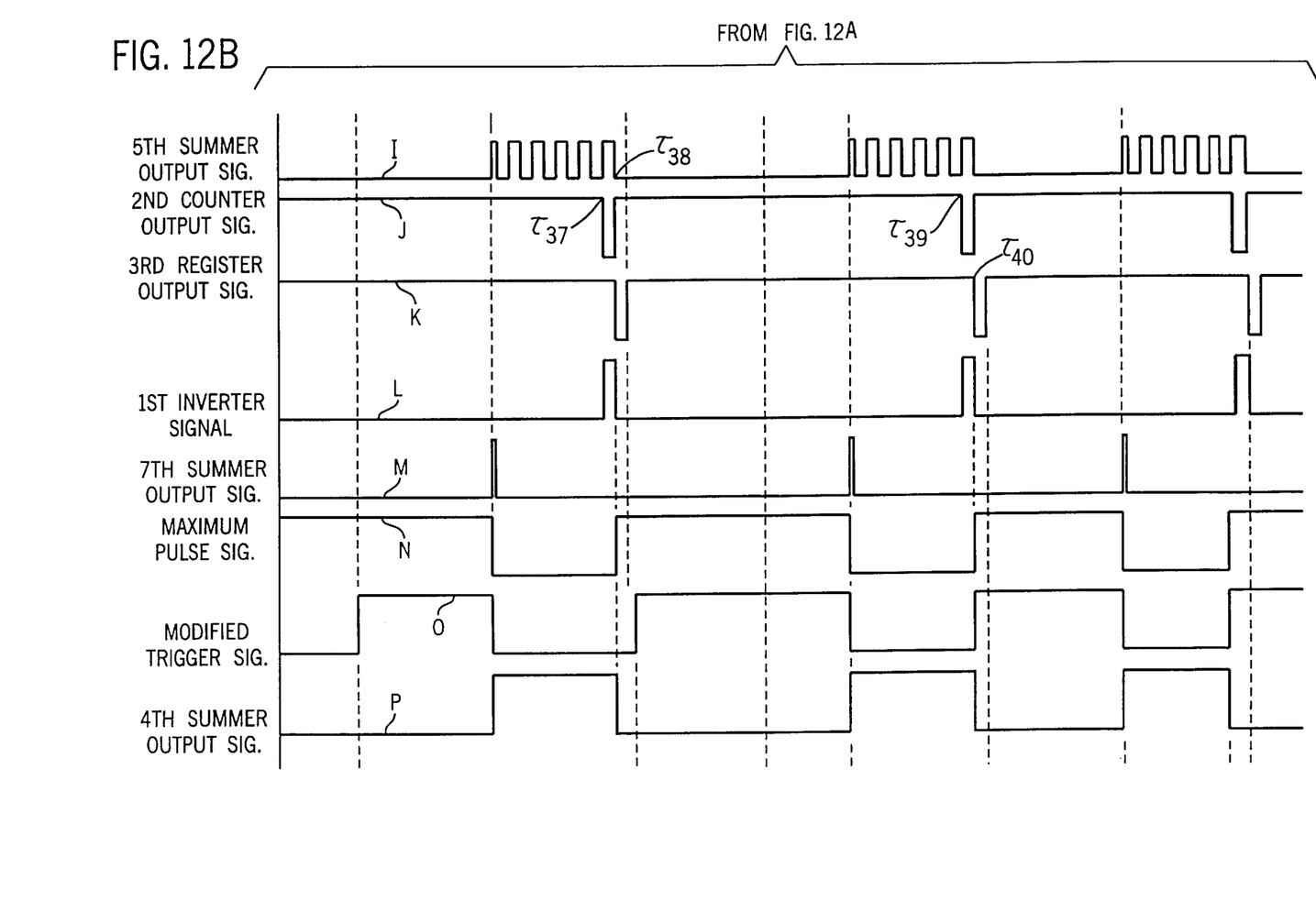

Referring now to FIG. 12, a plurality of digital signals are illustrated wherein each signal oscillates between high and low logic values. Each signal is identified by a capital letter A through P. Each letter A through P corresponds to a different point on the correction module circuit 417 in FIG. 11. Signal A is the timing signal on line 401. Signal B is the third summer output signal on line 461. Signal C is an exemplary trigger signal provided on line 410. Signal D is the first register output signal on line 463. Signal D is also referred to herein as a minimum duration signal. Signal E is the minimum pulse signal provided on line 453. Signal F is a load signal provided on line 389. Signal G is the first counter output signal on line 457. Signal H is the load summer output signal on line 459. Signal I is the fifth summer output signal on line 469. Signal J is the second counter output signal on line 471. Signal K is the third register output signal on line 467. Signal L is the first inverter signal on line 473. Signal M is the seventh summer output signal on line 487. Signal N is the maximum pulse or maximum duration signal on line 455. Signal O is the modified trigger signal on line 451. Signal P is the fourth summer output signal on line 485.

Referring now to FIGS. 11 and 12, timing signal A, load signal F and trigger signal C are all input signals to module 417 and modified trigger signal O is the only output signal from module 417. For the purposes of this explanation, it will be assumed that initially trigger signal C is low and load signal F is high. Also, it will be assumed that first register output signal D is initially latched low and therefore, third summer output signal B is also initially low. In addition, because both trigger signal C and first register output signal D are initially low, minimum pulse signal E also will initially be low. Both the first counter output signal G and the second counter output signal J are initially high and remain high until the first and second counts, respectively, equal zero. Because the load signal F and the first counter output signal G are both initially high, the load summer output signal H is also initially high. Fifth summer output signal I is initially low. Because second counter output signal J is initially high, the third register output signal K is also initially high. As first inverter signal L is the inverse of the second counter output signal, signal L is initially low.

At time $\tau_{21}$, load signal F is changed from high to low. When load signal F changes from high to low, load summer output signal H also changes from high to low providing a low voltage at load terminal LDN of counter 444. Because load terminal LDN is inverted, when the low voltage is received, first counter 444 resets the first count equal to critical dwell time $T_\alpha$ signal H remains low until $\tau_{22}$ when signal F again goes high.

Trigger signal C which is initially low, changes from low to high at time $\tau_{23}$ and remains high until time $\tau_{24}$. Then, trigger signal C again changes from low to high at time $\tau_{25}$ and remains high until time $\tau_{26}$. Thereafter, at time $\tau_{27}$, signal C again changes from low to high and remains high until time $\tau_{28}$. At time $\tau_{29}$, signal C changes from low to high and remains high until time $\tau_{30}$. Once again, at time $\tau_{31}$, signal C changes from low to high.

In the example considered here, the critical dwell time $T_\alpha$ has a duration equal to 6 clock signal cycles (see FIG. 12, third summer output signal B). Referring to trigger signal C, clearly, the high voltage pulses between times $\tau_{23}$ and $\tau_{24}$ and times $\tau_{25}$ and $\tau_{26}$ have durations which are less than the critical dwell time $T_\alpha$. Similarly, the low voltage pulses between times $\tau_{24}$ and $\tau_{25}$ and between times $\tau_{28}$ and $\tau_{29}$ also have durations which are less than the critical dwell time $T_\alpha$. All of the other high voltage and low voltage pulses illustrated in FIG. 12 have durations which exceed dwell time $T_\alpha$. Therefore, to eliminate greater than twice over voltage due to high and low voltage pulses which have durations less than dwell time $T_\alpha$, trigger signal C must be modified.

To this end, referring also to FIG. 11, minimum pulse module 434 modifies trigger signal C such that the duration of every high voltage pulse is equal to or exceeds the critical dwell time $T_\alpha$. Similarly, maximum pulse module 432 modifies trigger signal C such that the duration of every low voltage pulse is equal to or exceeds the critical dwell time $T_\alpha$.

1. Minimum Pulse Module

Referring still to FIGS. 11 and 12, with the first and second counts set equal to critical dwell time $T_\alpha$, at time $\tau_{23}$ trigger signal C changes from low to high causing first register output signal D to change from low to high. When signal D changes from low to high, third summer 456 provides the clock signal as third summer output signal B to the count terminal DN of first counter 444. Each time third summer output signal B changes from low to high, counter 444 decrements the first count by one. The first counter output signal G remains high until the first count is equal to zero. While first counter output signal G remains high, the second register output signal on line 465 also remains high latching the first register output signal D high.

At time $\tau_{24}$, trigger signal C changes from high to low. However, because the second register output signal on line 465 remains high at time $\tau_{24}$, that signal continues to latch first register output signal D high. Similarly, at time $\tau_{25}$, register 452 remains latched and its output signal D remains high.

At time $\tau_{32}$, the first count is equal to zero and the first counter output signal G is changed from high to low for a short period. One clock cycle later, at time $\tau_{26}$, the second register output signal on line 465 changes from high to low resetting register 452. When register 452 is reset at time $\tau_{26}$, the first register output signal D is reset low and remains low until the trigger signal C again changes from low to high. Thus, first register output signal D changes from low to high when the trigger signal C changes from low to high and remains high for a period equal to the duration of dwell time $T_\alpha$ despite changes in the state of the trigger signal.

Minimum pulse signal E is high when either the trigger signal C or first register output signal D or both signals C and D are high. Thus, between times $\tau_{23}$ and $\tau_{26}$, minimum pulse signal E remains high and the high voltage pulses between times $\tau_{23}$ and $\tau_{24}$ and times $\tau_{25}$ and $\tau_{26}$ are replaced with a high voltage pulse having a duration equal to dwell time $T_\alpha$. In addition, note that the low voltage signal between times $\tau_{24}$ and $\tau_{25}$ has been eliminated.

The second register output signal on line 465 is also provided to load summer 490 and, when the signal on line 465 changes from high to low, causes load summer output signal H to also change from high to low at time $\tau_{26}$. Signal H remains low until time $\tau_{33}$. While low, signal H causes counter 444 to reset the first count equal to critical dwell time $T_\alpha$.

Continuing, at time $\tau_{27}$, trigger signal C again changes from low to high. Therefore, first register output signal D and minimum pulse signal E also change from low to high and the third summer output signal B again tracks the clock signal on line 421 causing counter 444 to count out the duration of the critical dwell time $T_\alpha$. At time $\tau_{34}$ the first count again equals zero and the first counter output signal G is changed from high to low for a short period. At time $\tau_{35}$, which is one clock cycle after time $\tau_{34}$, the second register output signal on line 465 changes from high to low resetting register 452 and the first register output signal D to a low value. However, trigger signal C remains high until time $\tau_{28}$. For this reason, despite the first register output signal D changing from high to low at time $\tau_{35}$, minimum pulse signal E remains high between times $\tau_{27}$ and $\tau_{28}$. Once again, signal H resets the first count equal to the critical dwell time $T_\alpha$ at time $\tau_{35}$.

Continuing, at time $\tau_{29}$ trigger signal C again changes from low to high and first register output signal D and minimum pulse signal E follow suit. At time $\tau_{36}$, the second register output signal on line 465 resets register 452 and sets the first register output signal D low. Once again, however, the minimum pulse signal E remains high as trigger signal C has a high duration between times $\tau_{29}$ and $\tau_{30}$ which is greater than critical dwell time $T_\alpha$.

It should be appreciated that minimum pulse module 434 increases the duration of high voltage pulses which will cause greater than twice over voltage such that the resulting increased pulses have durations which are equal to or greater than the critical dwell time $T_\alpha$.

2. Maximum Pulse Module.

Referring still to FIGS. 11 and 12, module 432 receives the minimum pulse signal E from minimum pulse module 434. Generally, each time the minimum pulse signal E changes from high to low, module 432 maintains a maximum pulse signal N low for a period equal to the duration of dwell time $T_\alpha$ and then changes the maximum pulse signal N from low to high. In addition to minimum pulse signal E, module 432 also receives the modified trigger signal O.

Initially, with maximum pulse signal N high the second inverter signal on line 475 is low and therefore fifth summer output signal I is low and counter 450 does not decrement the second count. At this time, second counter output signal J is high and therefore first inverter signal L is low. Fourth register output signal N, which is also the maximum pulse signal, remains latched high until the signal on line 491 which is attached to its clock terminal changes from low to high. For the signal on line 491 to change from low to high, either the fourth summer output signal P must change from low to high or the seventh summer output signal M must change from low to high. With maximum pulse signal N high, the fourth summer output signal P remains low. With minimum pulse signal E low, the output of sixth summer 476 remains low and therefore the output of sixth register 486 remains latched low. Therefore, seventh summer output signal M also remains low.

When minimum pulse signal E changes from low to high, fourth inverter signal on line 477 changes from high to low and seventh summer output signal M on line 487 remains low. In addition, maximum pulse signal N remains high and fourth summer output signal P therefore remains low. Thus, at time $\tau_{23}$ when the minimum pulse signal E changes from low to high, the maximum pulse signal N remains unchanged.

Continuing, at time $\tau_{26}$, when the minimum pulse time E changes from high to low, the fourth inverter signal on line 477 changes from low to high. In addition, the sixth summer output signal on line 479 goes low and, one clock cycle after the minimum pulse signal E goes low, the fifth register output signal on line 481 changes from high to low. When the fifth register output signal changes from high to low, the output of register 486 is reset low. However, there is a small period between the time when the fourth inverter signal on line 477 goes high and the signal on line 483 goes low during which both the signals on lines 477 and 483 are high and therefore the seventh summer output signal M goes high at time $\tau_{26}$. Although signal M only goes high for a short period, the short period is sufficiently long to cause both the eighth summer output signal and the ninth summer output signal to go high providing a high signal to clock terminal C on register 458.

When terminal C goes high at time $\tau_{26}$, register 458 provides low first inverter signal L at its output terminal Q as maximum pulse signal N. Thus, at time $\tau_{26}$, maximum pulse signal N changes from high to low. Once maximum pulse signal N goes low, both inputs to fourth summer 460, including the modified trigger signal O and the maximum pulse signal N are low. Therefore, the fourth summer output signal P remains high and both the eighth and ninth summer output signals remain high such that the timing signal is provided to the clock terminal C of register 458.

In addition, when signal N changes from high to low, modified trigger signal O is also low such that the third inverter signal on line 500 is high. Similarly, when signal N is low, the second inverter signal on line 475 is also high. At this instant, fifth summer 462 provides the clock signal as fifth summer output signal I. Signal I is provided to second counter 450. Each time signal I changes from low to high, counter 450 decrements the second count by one. When the second count reaches zero at time $\tau_{37}$, the second counter output signal J changes from high to low. One timing signal cycle after signal J goes low, third register output signal K changes from high to low resetting the second count equal to critical dwell time $T_\alpha$.

In addition, when second counter output signal J changes from high to low, first inverter signal L changes from low to high at time $\tau_{37}$ causing register 458 to change maximum pulse signal N from low to high. When maximum pulse signal N changes from low to high, the fourth summer output signal P again changes from high to low causing the signal at clock terminal C of register 458 to go low thereby once again latching maximum output signal N high.

Thus, at time $\tau_{38}$, once the low voltage pulse of maximum pulse signal N has been low for a period equal to the duration of dwell time $T_\alpha$, signal N changes from low to high. Continuing, once again at time $\tau_{28}$ the minimum pulse signal E changes from high to low. Inverter 474, registers 484 and 486 and summers 476 and 478 cooperate to generate a short high voltage seventh summer output signal at time $\tau_{28}$ thereby providing a signal to clock terminal C of register 458 such that register 458 changes the maximum pulse signal from high to low. When signal N goes low, counter 450 again decrements the second count until the second count is equal to zero. Once the second count is equal to zero at time $\tau_{39}$, the second count signal J changes from high to low and register 470 resets the second count equal to dwell time $T_\alpha$. In addition, at time $\tau_{39}$, first inverter signal L changes from low to high and maximum pulse signal N follows suit and changes from low to high.

Referring still to FIGS. 11 and 12, first summer 436 receives both the minimum pulse signal E and the maximum pulse signal N and, when both signals E and N are high, provides a high modified trigger signal O on line 418. Thus, modified trigger signal O changes from low to high at time $\tau_{23}$ and remains high until time $\tau_{26}$ Signal O again changes from low to high at time $\tau_{27}$ and remains high until time $\tau_{28}$ Signal O changes from low to high at time $\tau_{36}$ and remains high until time $\tau_{30}$ and then once again changes from low to high at time $\tau_{31}$.

Comparing modified trigger signal O to the initial trigger signal C, clearly modified signal O has high voltage and low voltage pulses which all have durations either equal to or greater than the critical dwell time $T_\alpha$ and therefore greater than twice over voltage conditions are eliminated.

This concludes the detailed description of the preferred embodiment. However, it should be appreciated by those of ordinary skill in the art that the description herein is given only by way of example and that various modifications and additions might be made, while still coming within the scope of the invention. For example, while the preferred hardware configuration includes a minimum pulse module 434 which initially receives the trigger signal C and provides a minimum pulse signal E which, after the trigger signal changes from low to high, remains high for a duration equal to the greater of either the critical dwell time or the trigger signal and also includes a maximum pulse module which provides a maximum pulse signal with low voltage pulses having periods equal to the dwell time $T_\alpha$, clearly, the maximum pulse module could receive the trigger signal C and the minimum pulse module would then receive a variation of the maximum pulse signal to derive the minimum pulse signal. The most important aspect of the present invention is that trigger signals are modified in real time by counting out the duration of the critical dwell time as opposed to being modified using a digital processor prior to actually generating the signals.

To apprise the public of the scope of this invention, we make the following claims:

We claim:

1. An apparatus for use with a pulse width modulating controller, a PWM inverter and a three phase motor, the controller providing a trigger signal for controlling the inverter, the trigger signals alternating between high and low states, the inverter providing exciting motor voltages for driving the motor, the apparatus for substantially eliminating exciting motor voltage greater than twice the maximum intended amplitude by, when a trigger signal is not in over modulation, modifying the trigger signal to provide a modified trigger signal having ON and OFF times at least as long as a critical dwell time where the critical dwell time is the smallest period which will eliminate greater than twice the maximum intended amplitude, the apparatus comprising:

first, second and third correction modules, a separate correction module for each of the three motor phases, each correction module receiving a separate trigger signal, each module including:

a first pulse module which receives the trigger signal and, when the trigger signal changes from a first state to a second state, provides a first pulse signal at the second state which remains at the second state for a period equal to the greater of the critical dwell time duration and the duration of the second state trigger signal;

a second pulse module which, when the first pulse signal changes from the second state to the first state, provides a second pulse signal at the first state which remains at the first state for a period equal to the critical dwell time duration;

a first summer which receives the first pulse signal and the second pulse signal and when both the first and second pulse signals are at the second state, provides a modified trigger signal at the second state and provides a modified trigger signal at the first state at all other times.

2. The apparatus of claim 1 wherein the first pulse module is a minimum pulse module, the second pulse module is a maximum pulse module, the first state is low and the second state is high.

3. The apparatus of claim 2 wherein the controller also provides a timing signal, and the apparatus also includes a clock register, the timing signal is received by the clock register, the clock register providing a clock signal which alternates between high and low each time the timing signal changes from low to high, the clock signal provided to the minimum pulse module and the maximum pulse module.

4. The apparatus of claim 3 wherein the minimum pulse module includes a first enabler, a first counter and a second summer, the first counter programmed with a first count equal to the critical dwell time, the first enabler receiving the trigger signal and the clock signal, when the trigger signal changes from low to high the first enabler providing a high minimum duration signal and a first clock signal until the trigger signal is low and the first enabler is reset, when provided, the first clock signal equal to the clock signal, the first counter receiving the first clock signal and, each time the first clock signal changes from low to high, decrementing the first count and, when the first count is equal to zero, resetting the first enabler and resetting the first count equal to the critical dwell time, the second summer receiving the minimum duration signal and the trigger signal and, when one or both of the minimum duration and trigger signals is high, providing a high minimum pulse signal and, wherein, the maximum pulse module includes a second enabler and a second counter, the second counter programmed with a second counter count equal to the critical dwell time, the second enabler receiving the minimum pulse signal and the clock signal, when the minimum pulse signal changes from high to low, the second enabler providing a low maximum pulse signal and a second clock signal until the second enabler is reset, when provided, the second clock signal equal to the clock signal, the second counter receiving the second clock signal and, each time the second clock signal changes from low to high, decrementing the second count and, when the second count is equal to zero, resetting the second enabler and resetting the second count to the critical dwell time.

5. The apparatus of claim 4 wherein the first enabler includes first and second registers and a third summer, the first register receiving the trigger signal and providing the minimum duration signal, the third summer receiving the minimum duration signal and the clock signal and generating a high first clock signal when the clock signal and the minimum duration signal are high, the first counter providing a first counter output signal which indicates when the first count equals zero, the second register receiving the first counter output signal and resetting the first register and the first count when the first counter output signal indicates that the first count is equal to zero.

6. The apparatus of claim 5 wherein the second enabler includes a third register, the second counter providing a second counter output which indicates when the second count equals zero, the third register receiving the second counter output signal and resetting the second count when the second counter output signal indicates that the second count is equal to zero.

7. The apparatus of claim 6 wherein the first counter provides a low first counter output signal when the first count equals zero and provides a high first counter output signal at all other times and the second counter provides a low second counter output signal when the second count equals zero and provides a high second counter output signal at all other times.

8. The apparatus of claim 7 wherein the maximum pulse module further includes a fourth summer, a fifth summer, first, second and third inverters and a fourth register, the first inverter receives and inverts the second counter output signal providing a first inverter signal, the fourth register receives the first inverter signal and provides the maximum pulse signal, the fourth summer receives the modified trigger signal and the maximum pulse signal and provides a fourth summer output signal, the fourth summer output signal high when both the maximum pulse signal and the modified trigger signal are low and low under all other conditions, the fourth summer output signal linked to the fourth register, the maximum pulse signal set equal to the first inverter signal when the fourth summer output signal is high, the second inverter receiving and inverting the maximum pulse signal providing a second inverter signal, the third inverter receiving and inverting the modified trigger signal providing a third inverter signal, the fifth summer receiving the second and third inverter signals and the clock signal, when each of the second and third inverter signals is high, the fifth summer providing the second clock signal equal to the clock signal.

9. The apparatus of claim 8 wherein the second enabler further includes a fourth inverter, a sixth summer, a seventh summer, an eighth summer, a ninth summer, a fifth register and a sixth register, the fourth inverter receiving and inverting the minimum pulse signal providing a fourth inverter signal, the fifth register receiving the minimum pulse signal and the timing signal and providing a fifth register output signal which is updated to equal the minimum pulse signal each time the timing signal changes from low to high, the sixth summer receiving the timing signal and the minimum pulse signal and, when both the timing signal and the minimum pulse signal are high, providing a high sixth summer signal, the sixth register receiving the maximum pulse signal, the fifth register output signal and the sixth summer signal and providing a sixth register output signal, the sixth register output signal updated to equal to maximum pulse signal each time the fifth register output signal is low and the sixth summer signal changes from low to high, the seventh summer receiving both the sixth register output signal and the fourth inverter signal and providing a seventh summer signal, when both the sixth register output signal and the fourth inverter signal are high, the seventh summer providing a high seventh summer signal, the eighth summer receiving the seventh summer signal and the fourth summer signal and providing an eighth summer signal, the eighth summer signal high when one or both of the seventh summer signal or the fourth summer signal is high, the ninth summer receiving the timing signal and the eighth summer signal and providing a ninth summer signal, the ninth summer signal high when both the timing signal and the eighth summer signal are high, the fourth register providing the first inverter signal as the maximum pulse signal when the ninth summer output changes from low to high.

10. The apparatus of claim 9 wherein the first, third, fifth, sixth, seventh, and ninth summers are logical AND gates, the second and eighth summers are logical OR gates and the fourth summer is a logical OR gate with an inverted output.

11. The apparatus of claim 10 further including a latch which is linked to the first and second counters and can be used to modify the critical dwell time.

12. The apparatus of claim 11 wherein the first, second, third, fourth, fifth and sixth registers are DQ flip flops and the clock register is a JK flip flop.

* * * * *